(12) United States Patent
Buckman et al.

(10) Patent No.: US 10,482,451 B2
(45) Date of Patent: Nov. 19, 2019

(54) METHOD OF USING BIOINFORMATICS AND GEOGRAPHIC PROXIMITY TO AUTHENTICATE A USER AND TRANSACTION

(71) Applicant: MASTERCARD INTERNATIONAL INCORPORATED, Purchase, NY (US)

(72) Inventors: Brien Buckman, Stamford, CT (US); Benjamin Alexander Flast, New York, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 480 days.

(21) Appl. No.: 15/161,463

(22) Filed: May 23, 2016

(65) Prior Publication Data

US 2017/0337540 A1 Nov. 23, 2017

(51) Int. Cl.
*G06Q 40/00* (2012.01)
*G06Q 20/32* (2012.01)
(Continued)

(52) U.S. Cl.
CPC ....... *G06Q 20/327* (2013.01); *G06Q 20/3223* (2013.01); *G10L 17/06* (2013.01);
(Continued)

(58) Field of Classification Search
USPC .......................................................... 705/40
See application file for complete search history.

(56) References Cited

U.S. PATENT DOCUMENTS 9,189,788 B1 11/2015 Robinson et al.
9,519,901 B1* 12/2016 Dorogusker ......... G06Q 20/401
(Continued)

OTHER PUBLICATIONS

NY tech "evolution of the mobile payment market" Oct. 15, 2015 NY Robert Tibbs. and others (Year: 2015).*
(Continued)

*Primary Examiner* — Bruce I Ebersman
(74) *Attorney, Agent, or Firm* — Baker Botts L.L.P.

(57) ABSTRACT

Systems and methods for authenticating payment transactions using a payment card processing system are disclosed. A method for processing one or more payment transactions using a payment processing system in communication with a computer readable storage medium includes receiving a push or pull request from a first device associated with a first user, wherein the push or pull request relates to a transaction with a second device associated with a second user, receiving a first biometric measurement from the first device, and receiving a second biometric measurement from the second device. The method further includes, responsive to determining that the first biometric measurement identifies the first user, determining that the second biometric measurement identifies the second user, and determining that the first device and second device are within a predetermined relative proximity, effecting the transaction based on the push or pull request. A payment network can be configured to store or access a database including a plurality of biometric parameters that identify a plurality cardaccount holders and other transaction requirement parameters.

15 Claims, 4 Drawing Sheets

(51) Int. Cl.
*H04W 76/14* (2018.01)
*H04W 4/80* (2018.01)
*H04W 4/029* (2018.01)
*G10L 17/06* (2013.01)

(52) U.S. Cl.
CPC ............. *H04W 4/029* (2018.02); *H04W 4/80* (2018.02); *H04W 76/14* (2018.02)

(56) References Cited

U.S. PATENT DOCUMENTS

| | | | | |
|---|---|---|---|---|
| 9,823,737 | B2* | 11/2017 | Mazed | G06F 3/011 |
| 10,176,476 | B2* | 1/2019 | Desai | G06Q 20/08 |
| 2012/0240195 | A1* | 9/2012 | Weiss | H04L 63/0846 |
| | | | | 726/4 |
| 2013/0275308 | A1 | 10/2013 | Paraskeva et al. | |
| 2015/0310443 | A1 | 10/2015 | Thomasson | |

OTHER PUBLICATIONS

International Search Report and Written Opinion dated Jul. 24, 2017 in International Application No. PCT/US2017/031218.

* cited by examiner

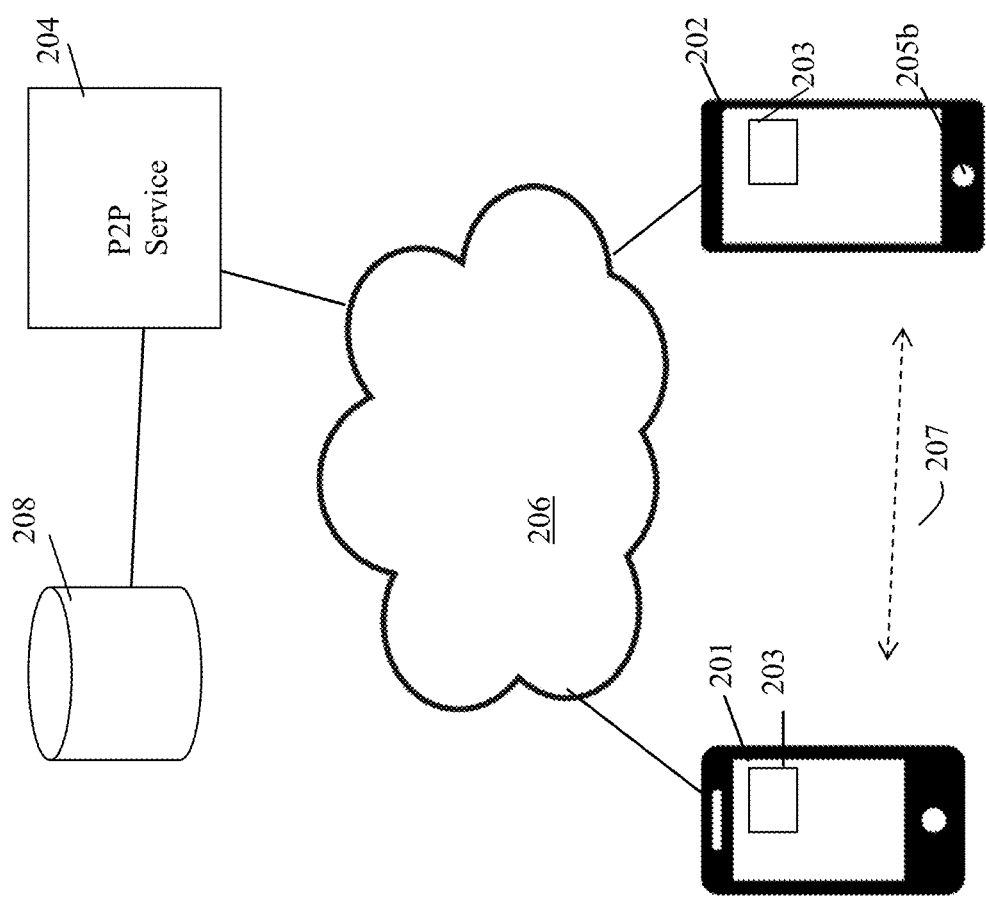
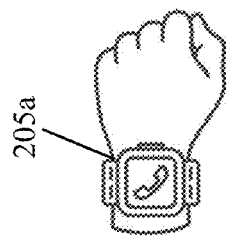
FIG. 2

METHOD OF USING BIOINFORMATICS AND GEOGRAPHIC PROXIMITY TO AUTHENTICATE A USER AND TRANSACTION

FIELD OF THE INVENTION

This invention relates to systems and methods for authenticating peer-to-peer ("P2P") transactions.

BACKGROUND

Many online transactions involve peer-to-peer transactions between private individuals. For example, digital noticeboards are popular for buying and selling used items. However, buyers and sellers may have limited contact before performing a P2P transaction. In these cases, it may be difficult for buyers and sellers to verify each party's identity to ensure that the transaction is not fraudulent. For example, the seller must trust that the buyer has access to the necessary funds to purchase the sales good, and that the buyer will hand over the agreed amount of money. With the proliferation of identity theft, some buyers may provide stolen payment details of another user, and the seller may be forced to return funds received after sold goods have already been handed over to a buyer. Further, the transactions may often occur using different payment applications with many user accounts. A buyer, for example, may provide an erroneous payment to an account that is not in fact associated with the intended seller, and then the buyer may have difficulty retrieving the erroneous payment. It would be desirable to provide a method of authenticating P2P transactions while ensuring the correct identity of each party to the transaction.

SUMMARY

Systems and methods for processing one or more transactions for a payment card using a payment card processing system are provided.

According to one aspect of the disclosed subject matter, a system for authenticating one or more payment transactions using a payment processing system is provided. The system can include one or more processors and one or more computer readable storage media embodying software. The software can be configured, when executed by one or more of the processors, to receive a push or pull request from a first device associated with a first user, wherein the push or pull request relates to a transaction with a second device associated with a second user. The software can then receive a first biometric measurement from the first device and receive a second biometric measurement from the second device. Responsive to determining that the first biometric measurement identifies the first user, determining that the second biometric measurement identifies the second user, and determining that the first device and second device are within a predetermined relative proximity, the software can effect the transaction based on the push or pull request.

In some embodiments, the software can be further configured when executed to compare the first biometric measurement with a biometric parameter associated with the first user and compare the second biometric measurement with a biometric parameter associated with the second user. The software can then determine that the first biometric measurement identifies the first and second user by determining, based on the comparison, that the biometric measurement and the biometric parameters of the first and second user are substantially similar.

According to another aspect of the disclosed subject matter, a method for processing one or more payment transactions using a payment processing system in communication with a computer readable storage medium is disclosed. The method can include receiving a push or pull request from a first device associated with a first user, wherein the push or pull request relates to a transaction with a second device associated with a second user. The method can further include receiving a first biometric measurement from the first device and receiving a second biometric measurement from the second device. The computer readable storage medium can store a plurality of biometric parameters associated with a plurality of users. The method can also include responsive to determining that the first biometric measurement identifies the first user, determining that the second biometric measurement identifies the second user, and determining that the first device and second device are within a predetermined relative proximity, effecting the transaction based on the push or pull request. A payment network can be configured to store or access a database including a plurality of biometric parameters that identify a plurality of card account holders and other transaction requirement parameters.

BRIEF DESCRIPTION OF THE DRAWINGS

Further features of the invention, its nature, and various advantages will be more apparent from the following detailed description of the preferred embodiments and the accompanying drawings in which:

FIG. 2 is a diagram illustrating an exemplary system for authenticating P2P transactions using a payment processing system in communication with a computer readable storage medium.

DETAILED DESCRIPTION

Figure 1:
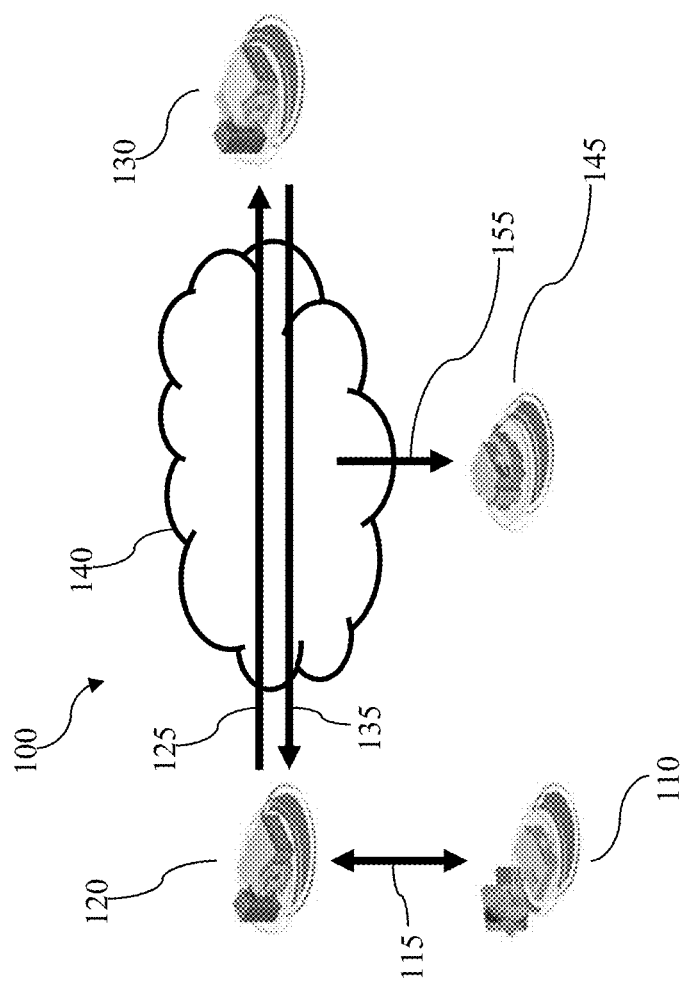
FIG. 1 is a diagram illustrating an exemplary system for processing payment card transactions for a payment card using a payment processing system.

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

The methods, systems, networks, and media presented herein can be used for authentication transactions. The disclosed subject matter is particularly suited for authentication of peer-to-peer (P2P) transactions that allow payments directly between individuals, instead of only customers merchants. For purpose of illustration and not limitation, a P2P transaction may involve payments between one or more friends, co-workers, siblings, or acquaintances. In some embodiments, P2P transaction users may be sellers or buyers of used or previously owned items, such as items sold on community listings or auction websites. Typically, users of P2P transactions may not be associated with or representative of a merchant or point of service such as a store or restaurant. In some embodiments, P2P transactions involve private individuals without an official place of business or official corporate identity. These individuals may use personal computing devices to pay others, such as a smart phone. As such, P2P transactions may require authentication procedures to ensure that the correct buyer or seller are behind the transaction. Embodiments of the disclosed subject matter provide a method and system for securely facilitating P2P transactions using biometric information of the users in a transactions and a relative geographic proximity between the users.

In accordance with the disclosed subject matter herein, a method for authenticating P2P transactions is disclosed. The method can include storing biometric information associated with at least one cardholder at a database. The method can further include storing other transaction requirement parameters, including a predetermined relative proximity between at least two devices respectively associated with at least two users. For example, the method can include receiving a push or pull request from a first device associated with a first user, wherein the push or pull request relates to a transaction with a second device associated with a second user. A processor implemented at a P2P transaction service, for example, can receive a first biometric measurement from the first device, and receive a second biometric measurement from the second device. The processor can effect the transaction based on the push or pull request if it determines that the first biometric measurement identifies the first user, that the second biometric measurement identifies the second user, and that the first device and second device are within a predetermined relative proximity.

In accordance with another aspect of the disclosed subject matter, a payment network for authenticating transactions is disclosed. The payment network can include a plurality of merchants connected to at least one electronic payment network, at least one acquirer connected to the at least one electronic network, each merchant in communication with at least one of the at least one acquirer via the at least one payment network, and at least one issuer connected to the at least one electronic network, each acquirer in communication with at least one of the at least one issuer via the at least one payment network. At least one payment network server can be connected to the at least one electronic network and can automatically capture the information regarding payment card transactions from the payment network. At least one database can be connected to the at least one payment network server. The database can receive the information regarding payment card transactions from the server to the database, store biometric information identifying users, and store other kinds of payment parameter requirements including a predetermined geographical proximity.

Figure 3:
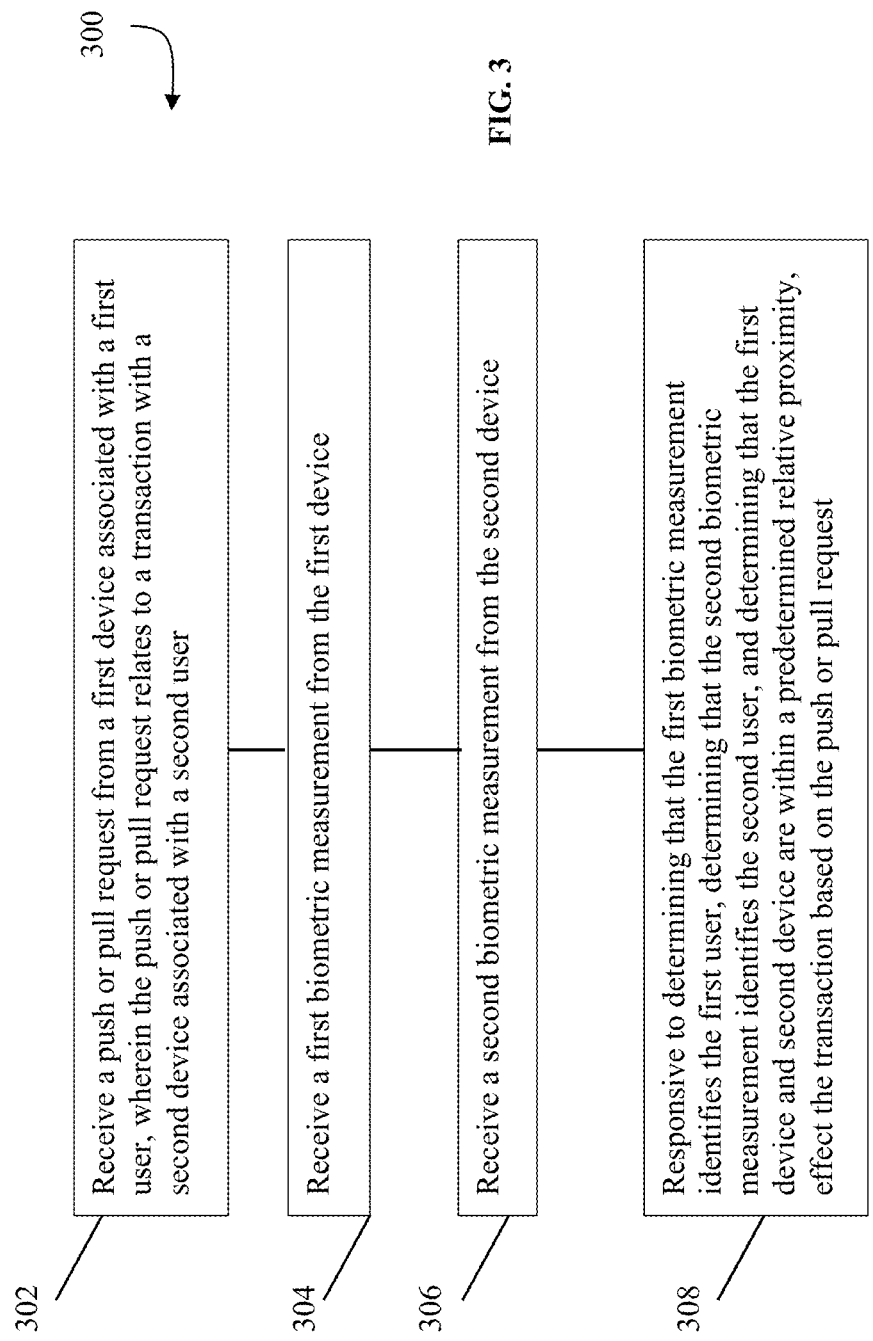
FIG. 3 is a flow diagram illustrating an exemplary method of authenticating P2P transactions.
Figure 4:
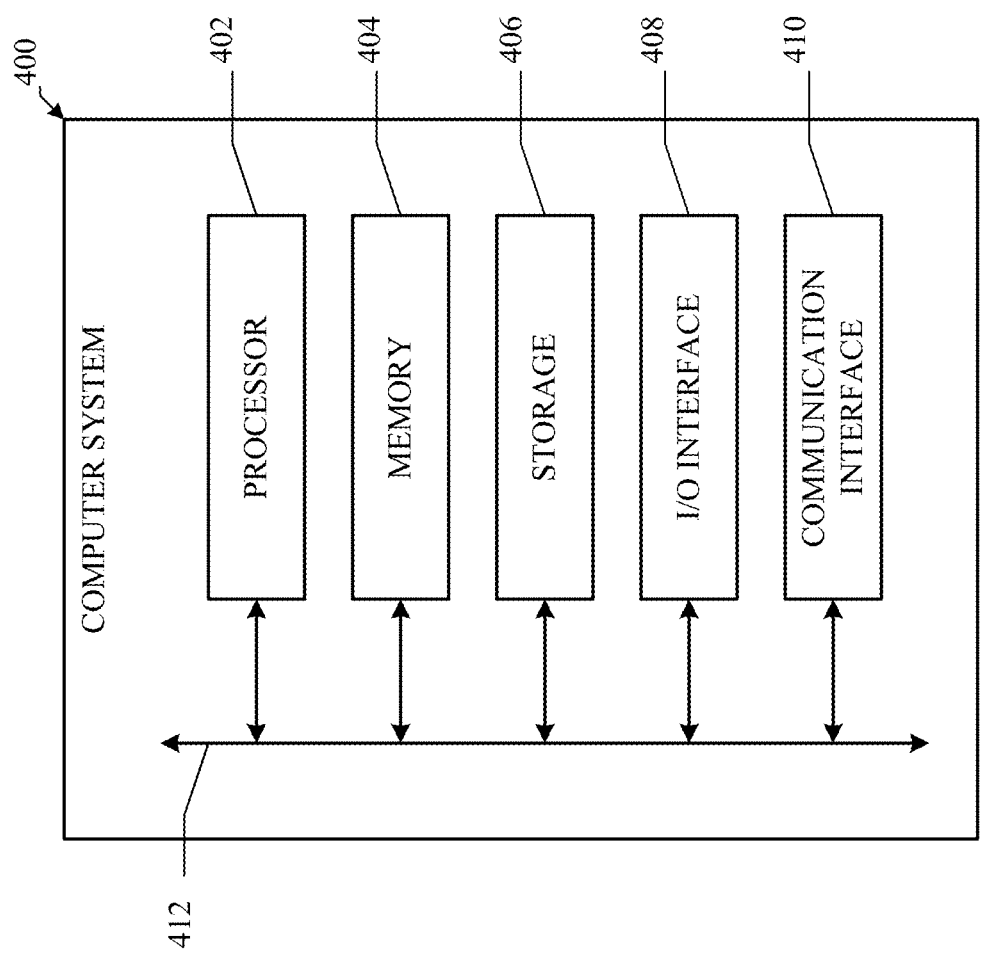
FIG. 4 is a diagram illustrating an exemplary computer system according to the disclosed subject matter.

The accompanying figures, where like reference numerals refer to identical or functionally similar elements throughout the separate views, further illustrate various embodiments and explain various principles and advantages all in accordance with the disclosed subject matter. For purpose of explanation and illustration, and not limitation, an exemplary embodiment of a payment network for authenticating transactions in accordance with the disclosed subject matter is shown in FIG. 1. An exemplary embodiment of a system for authenticating P2P transactions in accordance with the disclosed subject matter is shown in FIG. 2. FIG. 3 shows an exemplary embodiment of a method for authenticating P2P transactions in accordance with the disclosed subject matter. An exemplary embodiment of a computer system for use with the disclosed subject matter is shown in FIG. 4. While the present disclosed subject matter is described with respect to using methods, systems, networks, and media for authenticating transactions, one skilled in the art will recognize that the disclosed subject matter is not limited to the illustrative embodiments. For example, the methods, systems, networks, and media for authenticating P2P transactions can be used with a wide variety of settings, such as point-of-service transactions, bank transactions, store purchases, or any other suitable setting for transactions.

FIG. 1 depicts a diagram illustrating a representative payment network 100 according to an illustrative embodiment of the disclosed subject matter. Payment network 100 can allow for payment transactions in which merchants and card issuers do not necessarily have a one-to-one relationship. The payment network 100, for example and without limitation a credit card payment system, can utilize an electronic payment network 140, such as the MasterCard® payment card system interchange network. MasterCard® payment card system interchange network is a proprietary communications standard promulgated by MasterCard International Incorporated® based on the ISO 8583 message format for the exchange of financial transaction data between financial institutions that are customers of MasterCard International Incorporated. (MasterCard is a registered trademark of MasterCard International Incorporated located in Purchase, N.Y.)

As embodied herein, the payment network 100 for authenticating transactions can include at least one merchant 110 connected to at least one electronic payment network 140, either directly or through an acquirer 120 via connection 115. At least one acquirer 140 can be connected to the electronic network 140, each merchant 110 can be in communication with at least one acquirer 120 via the at least one payment network 140 or connection 115. At least one issuer 130 can be connected to the electronic network 140, and each acquirer 120 can be in communication with at least one issuer 130 via the electronic payment network 140.

For purpose of illustration and not limitation, in payment network 100, a financial institution, such as an issuer 130, can issue an account, such as a credit card account or a debit card account, to a cardholder, who can use the payment account card to tender payment for a purchase from a merchant 110 or to conduct a transaction at an ATM or website. To accept payment with the payment account number or card, merchant 110 can establish an account with a financial institution that is part of the financial payment system. This financial institution can be referred to as the "merchant bank" or the "acquiring bank," or herein as "acquirer 120." When a cardholder tenders payment for a purchase with a payment account card, the merchant, ATM, or website 110 can request authorization from acquirer 120 for the amount of the purchase. The request can be performed, for example, online via a website, by receiving input from a user through the website regarding cardholder account information, and communicate electronically with the transaction processing computers of acquirer 120. Alternatively, acquirer 120 can authorize a third party to perform transaction processing on its behalf. In this case, the point-of-sale terminal can be configured to communicate with the third party. Such a third party can be referred to as a "merchant processor" or an "acquiring processor." For example and not limitation, merchant 110 may be a P2P transaction service which facilitates direct transactions between cardholder accounts, instead of between a cardholder account and a point-of-service, such as a seller of goods or services. In P2P transactions, a first user may, for example, request a payment from a second user. If the second user accepts the first user's request, the second user may send a notification to the P2P transaction service along with the second user's cardholder account details, and the P2P transaction service or merchant 110 may process a payment from the second user's cardholder account, and in turn, send the payment to the first user's cardholder account. In each of the transactions between the P2P transaction service and the first user and the second user, transactions may be processed according to the authorization requests described below.

As embodied herein, using payment network 140, the computers of acquirer 120 or the merchant processor can communicate information regarding payment card transactions with computers of the issuer 130. For example and not limitation, information regarding payment card transactions can include an authorization request 125 and an authorization response 135. An authorization request 125 can be communicated from the computers of the acquirer 120 to the computers of issuer 130 to determine whether the cardholder's account is in good standing and whether the purchase is covered by the cardholder's available credit line or account balance. Based on these determinations, the authorization request 125 can be declined or accepted, and an authorization response 135 can be transmitted from the issuer 130 to the acquirer 120, and then to the merchant, website, or P2P transaction service 110. The authorization request 125 can include at least one of account identification information, location information, biometric information, and transaction information, as discussed herein. The authorization response 135 can include, among other things, a result of the determination that the transaction is approved or declined and/or information about the status of the payment card or payment account.

Additionally, the payment network 140 can store information or rules for handling authorization of transactions for payment cards in one or more transaction authentication databases 145. For example and not limitation, transaction authentication database 145 may store one or more biometric parameters associated with a cardholder account. Biometric parameters may include any biological or behavior characteristic that uniquely identifies users associated with cardholder accounts. For example and not limitation, biometric parameters may include fingerprints, face patterns, voice patterns, DNA, electrocardiography (EKG) signals, gait, typing rhythm, or other unique characteristics. Additionally, the transaction authentication database 145 may store other transaction parameters such as location of a cardholder or relative geographic proximity between two different cardholders. The payment network 140 may be configured to reference the transaction authentication database 145 for each authentication request 125. The transaction authentication database 145 may be configured to receive and store biometric parameters associated with users having cardholder accounts in an initial registration process. As embodied herein, the transaction authentication database 145 can be configured to only receive and store the biometric information associated with a cardholder account with the permission of the cardholder. Additionally, the transaction authentication database 145 can be configured to only receive and store the biometric information associated with a cardholder account in accordance with applicable data privacy laws. Additionally or alternatively, and as discussed further herein, merchant 110 may have access to transaction authentication database 145 in order to, for example, provide additional authentication services for a P2P transaction.

FIG. 2 is a schematic diagram illustrating an exemplary payment processing system 200 for facilitating peer-to-peer transactions. The system 200 comprises at least two user devices 201 and 202 capable of, or adapted to, transmit communications to, and to receive communications from, a peer-to-peer (P2P) transaction service 204 over a network 206. P2P transaction service 204 may be, for example, a merchant 110, network node or remote server with access to a payment network 140. Additionally or alternatively, the P2P transaction service 204 may be comprised within a base station.

The network 206 may comprise any network across which communications can be transmitted and received. For example, the network 206 may comprise a wired or wireless network. The network 206 may, for example, comprise one or more of: the internet; a local area network; a radio network such as a mobile or cellular network; a mobile data network or any other suitable type of network. In one embodiment the user device 202 communicates over the internet with the P2P transaction service 204 operating on 'a cloud'.

One or both of the at least two user devices 201, 202 may comprise a portable computing device (e.g. a laptop computer, a smartphone, a tablet computer etc.); a desktop computer; or any other suitable device. In an exemplary embodiment, user devices 201, 202 is running (or 'executing') a software application or 'app' 203 which, when executed by a processor of the user device 201, 202, allows the user devices 201, 202 to access P2P transaction service 204.

The P2P transaction service 204 may be configured to communicate with one or more respective P2P authentication databases 208 via a wired and/or a wireless connection. For example, the P2P transaction service 104 may write data to the one or more P2P authentication databases 208. Additionally or alternatively, the P2P transaction service 204 may retrieve data stored in, or accessible to, the P2P authentication databases 208. In some embodiments, P2P transaction service 204 may access P2P authentication database via a payment network node (e.g. payment network 140 of FIG. 1). P2P authentication database 208 may store information for providing authentication between a user and a device associated with the user (e.g., user device 202 for effecting a P2P transaction). The user may be a cardholder account that is linked to a bank account or funds managed by a financial institution. In some embodiments, P2P authentication database 208 may be integrated or coupled with transaction authentication database 145 as shown in FIG. 1. In some configurations, P2P authentication database 208 may be separate or remote from the transaction authentication database 145.

P2P authentication database 208 may store a table or array of biometric parameters associated with a plurality of users. When a user registers with a card issuer or with a P2P transaction service 204, the user may be prompted to transmit one or more uniquely identifying biometric features. Biometric features may include, for example, an EKG (electrocardiogram) measurement, a fingerprint, iris scan, a voice pattern, a facial pattern, or other biological or behavioral characteristic. The features may be digitized into a biometric parameter or "signature". For a fingerprint, for example, a biometric parameter may be stored as a high-resolution image scan of a fingerprint. For a voice pattern, for example, a biometric parameter may be stored as a sound clip along with extracted features of the sound clip, including pitch, tenor, or cadence of a predetermined sentence.

User devices 201, 202 may include one or more sensors 205 for measuring one or more biometric characteristics. A sensor 205b may be, for example, a fingerprint scanner and fully integrated with user device 202. In another example, a sensor 205a may be found on a smart watch or other wearable technology that can communicate or sync with user device 201 (e.g., via Bluetooth). Sensors 205 that are coupled to user devices 201, 202 may measure biometric characteristics of users operating user devices 201, 202. When a first user requests a transaction with a second user, user devices 201, 202 may receive a prompt for the user to input biometric measurements into the sensor 205. The user device 202 for the second user may output a prompt describing the push or pull request and requesting a biometric measurement. The user devices 201, 202 may transmit the biometric measurements to P2P transaction service 204 or other payment network node for analysis and authentication. P2P transaction service 204 may then compare the received biometric measurement with a biometric parameter associated with account details provided by the user devices 201, 202. The comparison may involve extracting the unique features of the received biometric measurement and comparing the unique features with the stored biometric parameter. If the received biometric measurement and the biometric parameter match or are substantially similar based on the extracted unique features, then the biometric measurement is determined to identify the user operating the user device 201, 202. If a match is not determined, then the transaction may not be effected, or the transaction may be cancelled.

P2P authentication database 208 may further store other transaction parameter requirements, such as a predetermined relative geographic proximity or a predetermined relative distance. This parameter may be set by a user, P2P transaction service, or one or more entities that are members of a payment network. For P2P transactions that involve an exchange of goods, a parameter defining relative proximity between parties of a transaction can ensure that a seller actually appears in the same place as a buyer to deliver a good or service. The parameter may be stored as a distance of 3-20 feet, for example. Other distances may be possible. A transaction requirement of relative proximity may allow a transaction between two parties to occur anywhere that parties can meet, instead of limited to a particular destination.

In some embodiments, determining whether users are within a predetermined relative proximity can occur when users are meeting to complete a transaction. For example, instead of continually tracking user devices to determine whether a user device has reached a destination, users may transmit their location (e.g., GPS coordinates or latitude-longitude coordinates) through a wireless connection with a central server (e.g., a base station or an authentication database 208), and transmission may occur only at the time of meeting. The wireless connection may be any long-range wireless communication standard, such as Wi-Fi or cellular communication, or a combination. In other embodiments, P2P transaction service 204 may track the relative proximity between devices by, for example, periodically tracking the real-time locations of the user devices and updating the P2P authentication database 208 of the distance between the user devices. Other means of tracking relative proximity may be possible. For example and not limitation, wireless communication standards that only operate or transmit data over short distances may be used to determine whether devices are within a predetermined relative proximity. These wireless communication standards may include Bluetooth or Near-Field Communication, or Wi-fi. Bluetooth, for example, may provide different types of service classes at different power levels for different distances. Relative proximity between two user devices 201, 202 may be determined by the type of Bluetooth connection that is used between them. For typical smart phone usage, Bluetooth connections between smart phones may be possible at a range of up to approximately 33 feet. If user devices 201, 202 can communicate via a short-range wireless connection 207 like a Bluetooth connection, and a predetermined relative proximity is set at 40 feet, then a P2P transaction service 204 may use the fact of the Bluetooth connection to determine that user devices 201, 202 are within the predetermined relative proximity. Similarly, communication via Near-Field Communication, which can occur at a maximum of a few inches, can also confirm a predetermined relative proximity. Other short-range wireless protocols may be used.

FIG. 3 is a flow diagram of a method 300 of authenticating a peer-to-peer transaction, according to the disclosed subject matter. In step 302, a P2P transaction service or merchant may receive a push or pull request from a first device associated with a first user. The push or pull request may describe a transaction with a second device associated with a second user. A push request, for example, may be a request for the first user to pay the second user. A pull request may be a request for the first user to receive payment from the second user. The requests may include transaction parameters, such as a payment amount and the first user's account details such as an account number or card number. In some embodiments, the second user may be prompted to accept the request by providing the second user's account details or providing biometric measurements, or both.

In step 304, a payment network node may receive a first biometric measurement from the first device. In step 306, the payment network node may also receive a second biometric measurement from the second device. The first and second biometric measurements may be received via sensors that are coupled with or integrated with first and second user devices, respectively.

In step 308, responsive to determining that the first biometric measurement identifies the first user, determining that the second biometric measurement identifies the second user, and determining that the first device and second device are within a predetermined relative proximity, the transaction based on the push or pull request may be effected. The transaction may be effected by contactless payment between the first and second device or by a payment network. Determining that the first and second biometric measurements identify their respective users may include comparing the first and second biometric measurements with biometric parameters associated with user account details provided by the first and second user devices. Determining that the first and second device are within a predetermined relative proximity may include determining the location of each device using GPS, WPS, or cell-tower triangulation, or by establishing a Bluetooth connection, a Near Field Communication connection, or other short-range wireless connection between the devices. This determination may occur, for example, when the first and second users meet in order to fully complete the requested transaction. In some embodiments, a relative proximity of the first and second device may be determined through a wireless connection between a central server or base station and the first and second device.

FIG. 4 illustrates an exemplary computer system 400 according to the disclosed subject matter. In some embodiments, one or more computer systems 400 perform one or more steps of one or more methods described or illustrated herein. In some embodiments, one or more computer systems 400 provide functionality described or illustrated herein. In some embodiments, software running on one or more computer systems 300 performs one or more steps of one or more methods described or illustrated herein or provides functionality described or illustrated herein. Some embodiments include one or more portions of one or more computer systems 400. Herein, reference to a computer system can encompass a computing device, and vice versa, where appropriate. Moreover, reference to a computer system can encompass one or more computer systems, where appropriate.

This disclosure contemplates any suitable number of computer systems 400, which may be used as the acquirer, issuer, and/or payment network computing system. This disclosure contemplates computer system 400 taking any suitable physical form. As example and not by way of limitation, computer system 400 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 can include one or more computer systems 400; be unitary or distributed; span multiple locations; span multiple machines; span multiple data centers; or reside in a cloud, which can include one or more cloud components in one or more networks. Where appropriate, one or more computer systems 400 can perform without substantial spatial or temporal limitation one or more steps of one or more methods described or illustrated herein. As an example and not by way of limitation, one or more computer systems 400 can perform in real time or in batch mode one or more steps of one or more methods described or illustrated herein. One or more computer systems 400 can perform at different times or at different locations one or more steps of one or more methods described or illustrated herein, where appropriate.

In some embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In some embodiments, processor 402 includes hardware for executing instructions, such as those making up a computer program. As an example and not by way of limitation, to execute instructions, processor 402 can retrieve (or fetch) the instructions from an internal register, an internal cache, memory 404, or storage 406; decode and execute them; and then write one or more results to an internal register, an internal cache, memory 404, or storage 406. In particular embodiments, processor 402 can include one or more internal caches for data, instructions, or addresses. This disclosure contemplates processor 402 including any suitable number of any suitable internal caches, where appropriate. As an example and not by way of limitation, processor 402 can include one or more instruction caches, one or more data caches, and one or more translation lookaside buffers (TLBs). Instructions in the instruction caches can be copies of instructions in memory 404 or storage 406, and the instruction caches can speed up retrieval of those instructions by processor 402. Data in the data caches can be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches can speed up read or write operations by processor 402. The TLBs can speed up virtual-address translation for processor 402. In some embodiments, processor 402 can include one or more internal registers for data, instructions, or addresses. This disclosure contemplates processor 402 including any suitable number of any suitable internal registers, where appropriate. Where appropriate, processor 402 can include one or more arithmetic logic units (ALUs); be a multi-core processor; or include one or more processors 402. Although this disclosure describes and illustrates a particular processor, this disclosure contemplates any suitable processor.

In some embodiments, memory 404 includes main memory for storing instructions for processor 402 to execute or data for processor 402 to operate on. As an example and not by way of limitation, computer system 400 can load instructions from storage 406 or another source (such as, for example, another computer system 400) to memory 404. Processor 402 can then load the instructions from memory 404 to an internal register or internal cache. To execute the instructions, processor 402 can retrieve the instructions from the internal register or internal cache and decode them. During or after execution of the instructions, processor 402 can write one or more results (which can be intermediate or final results) to the internal register or internal cache. Processor 402 can then write one or more of those results to memory 404. In some embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which can each include an address bus and a data bus) can couple processor 402 to memory 404. Bus 412 can include one or more memory buses, as described below. In particular embodiments, one or more memory management units (MMUs) reside between processor 402 and memory 404 and facilitate accesses to memory 404 requested by processor 402. In some embodiments, memory 404 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 404 can include one or more memories 404, where appropriate. Although this disclosure describes and illustrates particular memory, this disclosure contemplates any suitable memory.

In some embodiments, storage 406 includes mass storage for data or instructions. As an example and not by way of limitation, storage 406 can include a hard disk drive (HDD), a floppy disk drive, flash memory, an optical disc, a magneto-optical disc, magnetic tape, or a Universal Serial Bus (USB) drive or a combination of two or more of these. Storage 406 can include removable or non-removable (or fixed) media, where appropriate. Storage 406 can be internal or external to computer system 400, where appropriate. In some embodiments, storage 406 is non-volatile, solid-state memory. In some embodiments, storage 406 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 can include one or more storage control units facilitating communication between processor 402 and storage 406, where appropriate. Where appropriate, storage 406 can include one or more storages 406. Although this disclosure describes and illustrates particular storage, this disclosure contemplates any suitable storage.

In some embodiments, I/O interface 408 includes hardware, software, or both, providing one or more interfaces for communication between computer system 400 and one or more I/O devices. Computer system 400 can include one or more of these I/O devices, where appropriate. One or more of these I/O devices can enable communication between a person and computer system 400. As an example and not by way of limitation, an I/O device can include a keyboard, keypad, microphone, monitor, mouse, printer, scanner, speaker, still camera, stylus, tablet, touch screen, trackball, video camera, another suitable I/O device or a combination of two or more of these. An I/O device can include one or more sensors. This disclosure contemplates any suitable I/O devices and any suitable I/O interfaces 408 for them. Where appropriate, I/O interface 408 can include one or more device or software drivers enabling processor 402 to drive one or more of these I/O devices. I/O interface 408 can include one or more I/O interfaces 408, where appropriate. Although this disclosure describes and illustrates a particular I/O interface, this disclosure contemplates any suitable I/O interface.

In some embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 can include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 400 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 can include any suitable communication interface 410 for any of these networks, where appropriate. Communication interface 410 can include one or more communication interfaces 410, where appropriate. Although this disclosure describes and illustrates a particular communication interface, this disclosure contemplates any suitable communication interface.

In some embodiments, bus 412 includes hardware, software, or both coupling components of computer system 400 to each other. As an example and not by way of limitation, bus 412 can include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 can include one or more buses 412, where appropriate. Although this disclosure describes and illustrates a particular bus, this disclosure contemplates any suitable bus or interconnect.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

While there have been described what are believed to be the preferred embodiments of the present invention, those skilled in the art will recognize that further changes and modifications may be made thereto without departing from the spirit of the invention, and it is intended to claim all such changes and modifications that are within the spirit of the invention.

It also will be understood that the systems and methods of the present invention can be implemented using any suitable combination of hardware and software. The software (i.e., instructions) for implementing and operating the aforementioned systems and methods can be provided on computer-readable media, which can include without limitation, firmware, memory, storage devices, micro controllers, microprocessors, integrated circuits, ASICS, on-line downloadable media, and other available media.

The invention claimed is:

1. A computer-implemented method of authenticating and processing a P2P payment at a payment transaction network, the method comprising:

receiving a push or pull request from a first device associated with a first user and adapted to communicate in a P2P network, wherein the push or pull request relates to a transaction with a second device associated with a second user and adapted to communicate in a P2P network;

in response to the push or pull request, outputting a prompt on the first and second device requesting a biometric measurement;

receiving a first biometric measurement from sensors coupled with the first device;

receiving a second biometric measurement from sensors coupled with the second device;

retrieving a first biometric parameter associated with the first user and a second biometric parameter associated the second user from one or more P2P transaction authentication databases, wherein the first and second biometric measurement are each a type selected from any one of: an EKG measurement, a fingerprint, iris scan, a voice pattern, gait, typing rhythm, and a facial pattern;

comparing the first biometric measurement with the first biometric parameter and comparing the second biometric measurement with the second biometric parameter;

periodically tracking a relative proximity between the first device and the second device, and updating the one or more P2P transaction authentication databases with the relative proximity, wherein the relative proximity between the first device and the second device is determined via a Bluetooth or Near-Field Communication connection between the first device and the second device; and responsive to determining that the first biometric measurement identifies the first user, determining that the second biometric measurement identifies the second user, and determining that the first device and second device are within a predetermined relative proximity, effecting the transaction based on the push or pull request.

2. The method of claim 1, comprising comparing the first biometric measurement with a biometric parameter associated with the first user.

3. The method of claim 1, comprising comparing the second biometric measurement with a biometric parameter associated with the second user.

4. The method of claim 2, comprising determining that the first biometric measurement identifies the first user by determining, based on the comparison, that the biometric measurement and the biometric parameter are substantially similar.

5. The method of claim 1, comprising: determining a first location of the first device, determining a second location of the second device, and determining the relative proximity between the first device and the second device based on the distance between the first location and the second location, and updating a P2P authentication database with the relative proximity.

6. The method of claim 1, wherein the push request relates to a payment from the first user to the second user.

7. The method of claim 1, wherein the pull request relates to a payment transaction from the second user to the first user.

8. The method of claim 1, comprising outputting a prompt on the second device describing the push or pull request and requesting a biometric measurement.

9. The method of claim 1, wherein the transaction is effected by contactless payment between the first and second device or by a payment network.

10. The method of claim 1, wherein the first and second biometric measurements are different types.

11. A system for processing one or more payment transactions using a payment processing system, the system comprising:
one or more processors; and
one or more computer readable storage media embodying software that is configured when executed by one or more of the processors to:
receive a push or pull request from a first device associated with a first user and adapted to communicate in a P2P network, wherein the push or pull request relates to a transaction with a second device associated with a second user and adapted to communicate in a P2P network;
in response to the push or pull request, output a prompt on the first and second device requesting a biometric measurement;
receive a first biometric measurement from the first device;
receive a second biometric measurement from the second device;
retrieve a first biometric parameter associated with the first user and a second biometric parameter associated the second user from one or more P2P transaction authentication databases, wherein the first and second biometric measurement are each a type selected from any one of: an EKG measurement, a fingerprint, iris scan, a voice pattern, gait, typing rhythm, and a facial pattern;
compare the first biometric measurement with the first biometric parameter and compare the second biometric measurement with the second biometric parameter;
periodically track a relative proximity between the first device and the second device, and updating the one or more P2P transaction authentication databases with the relative proximity, wherein the relative proximity between the first device and the second device is determined via a Bluetooth or Near-Field Communication connection between the first device and the second device; and
responsive to determining that the first biometric measurement identifies the first user, determining that the second biometric measurement identifies the second user, and determining that the first device and second device are within a predetermined relative proximity, effect the transaction based on the push or pull request.

12. The system of claim 11, wherein the software is further configured when executed to:
compare the second biometric measurement with a biometric parameter associated with the second user; and
determine that the second biometric measurement identifies the second user by determining, based on the comparison, that the second biometric measurement and the biometric parameter are substantially similar.

13. The system of claim 11, wherein the software is further configured when executed to determine that the first device and second device are within a predetermined relative proximity based on a wireless connection between an authentication database and the first device and second device, wherein the central server is configured to determine the relative proximity between the first device and second device.

14. A payment network for processing one or more payment card transactions for a payment card, the payment network comprising:
a communication interface;
one or more processors connected to the communication interface; and
one or more computer readable storage media connected to the communication interface and to one or more of the processors, and embodying software that is configured when executed by one or more of the processors to:
receive a push or pull request from a first device associated with a first user and adapted to communicate in a P2P network, wherein the push or pull request relates to a transaction with a second device associated with a second user and adapted to communicate in a P2P network;
in response to the push or pull request, output a prompt on the first and second device requesting a biometric measurement;
receive a first biometric measurement from the first device;
receive a second biometric measurement from the second device;

retrieve a first biometric parameter associated with the first user and a second biometric parameter associated the second user from one or more P2P transaction authentication databases, wherein the first and second biometric measurement are each a type selected from any one of: an EKG measurement, a fingerprint, iris scan, a voice pattern, gait, typing rhythm, and a facial pattern;

compare the first biometric measurement with the first biometric parameter and compare the second biometric measurement with the second biometric parameter;

periodically track a relative proximity between the first device and the second device, and updating the one or more P2P transaction authentication databases with the relative proximity, wherein the relative proximity between the first device and the second device is determined via a Bluetooth or Near-Field Communication connection between the first device and the second device; and responsive to determining that the first biometric measurement identifies the first user, determining that the second biometric measurement identifies the second user, and determining that the first device and second device are within a predetermined relative proximity, effect the transaction based on the push or pull request.

15. The payment network of claim 14, wherein the software is further configured when executed to determine that the first device and second device are within a predetermined relative proximity determined via a wireless connection between the first device and the second device.

* * * * *